United States Patent Office 2,742,508
Patented Apr. 17, 1956

2,742,508

PRODUCTION OF 1,3,5-TRICHLOROBENZENE FROM WASTE ISOMERS OF BENZENE HEXACHLORIDE

Arnold N. Johnson, Fairlawn, N. J., assignor to Commercial Solvents Corporation, Terre Haute, Ind., a corporation of Maryland No Drawing. Application May 22, 1953,
Serial No. 356,905

7 Claims. (Cl. 260—650)

My invention relates to polychloro derivatives of benzene hexachloride and more particularly it relates to the production of 1,3,5-trichlorobenzene from any of the isomers of or any mixture of the isomers of benzene hexachloride.

Benzene hexachloride, which is also known as 1,2,3,4,-5,6-hexachlorocyclohexane, is ordinarily produced by reacting benzene in the liquid phase with chlorine in such a manner as to promote the addition of the chlorine to benzene. This reaction gives rise to the formation of five isomeric benzene hexachlorides known as the alpha, beta, gamma, delta, and epsilon isomers, these isomers being present in the mixture in varying quantities possessing different properties and utilities. To date the most important use of the benzene hexachlorides is as insecticides, parasiticides, etc. Unfortunately, however, only the gamma isomer is particularly effective for this purpose and, being present in the primary reaction product in amounts ranging customarily from approximately 10 to 20% of the total reaction mixture, it is for many purposes desirable to separate the gamma isomer from the remaining isomers which possess little or no utility for the above purposes.

The separation of the gamma isomer from the remaining isomers of benzene hexachloride gives rise to large quantities of mixtures of the alpha, beta, delta and epsilon isomers for which there has been little or no utility. The separation of the gamma isomer from benzene hexachloride thus incidentally produces large quantities of waste isomers, the accumulation of which indirectly increases the cost of the gamma isomer as well as presenting a problem of disposal of the waste isomers.

In the past, many attempts have been made to find a method for the utilization of the waste isomers of benzene hexachloride but up to the present time no successful method has been devised. A satisfactory use for the waste isomers would indirectly lower the cost of production of the gamma isomer and solve the huge problem of disposal of the waste isomers caused by the increasing demand for the gamma isomer of benzene hexachloride alone.

I have now discovered a process for the production of polychloro derivatives of benzene hexachloride which utilizes any of the isomers of benzene hexachloride including mixtures of the waste isomers resulting from the separation of the gamma isomer as well as mixtures of all the isomers of benzene hexachloride. The valuable reaction products produced by my new process include 1,3,5-trichlorobenzene, 1,2,4,5-tetrachlorobenzene, pentachlorobiphenyl and hexachlorobiphenyl. Of these reaction products, 1,3,5-trichlorobenzene is the most unique and important since it can be used as a dye intermediate, and is more reactive than 1,2,4-trichlorobenzene when nitrated. 1,2,4,5-tetrachlorobenzene is an intermediate in the production of certain germicides and selective herbicides, while the chlorinated biphenyls, tetrachlorobenzene, and trichlorobenzene are useful as transformer fluids. In addition the mixture of reaction products itself is useful as a transformer fluid.

In general, my new process consists of heating benzene hexachloride in the presence of a catalyst in a closed reaction system under autogenous pressure caused by liberation of hydrogen chloride. The benzene hexachloride which I employ in my process is not limited to a material from which the gamma isomer has been removed or partially removed. I can use any one of the isomers of benzene hexachloride in my process, a mixture of all five of the isomers, or a mixture of any of the isomers and the results will be the same. However, the important consideration is that a mixture of the alpha, beta, delta and epsilon isomers is operative in my process since this is the mixture resulting when the gamma isomer is extracted from the mixture of isomers produced by the chlorination of benzene. In other words, a mixture of the alpha, beta, delta and epsilon isomers is a mixture of the waste isomers of benzene hexachloride and the utilization of this mixture is an important and significant contribution to the industry in its production of benzene hexachloride.

The catalyst which I employ in my process can be any of the so called Friedel-Crafts catalysts, such as for example ferric chloride, aluminum chloride, etc. However, I prefer to use aluminum chloride because I have found it to be the most active in promoting the formation of 1,3,5-trichlorobenzene.

The amounts of benzene hexachloride and catalyst which are operative in my process range from a molar ratio of about 8 parts of benzene hexachloride per 1 part of catalyst to a molar ratio of about 0.5 part of benzene hexachloride per 1 part of catalyst. More specifically, I employ the catalyst in the amount of at least about 6.0% by weight of the benzene hexachloride. The mole ratio of the amounts of the two compounds which I prefer to use is 1 part of benzene hexachloride per 1 part of catalyst.

In carrying out my process, the temperatures which I employ are within the range of from about 200° to 210° C. The temperature which I prefer to use in carrying out my process is about 200° C. The length of time which I use to heat the benzene hexachloride and catalyst in my process ranges from about 16 to about 24 hours, the length of time being, in general, dependent upon the temperature at which the reaction is carried out. I employ longer periods of time when the temperaature at which the reaction is carried out is near the lower limits of the range which is set out above. On the other hand, when the temperature which I employ is near the upper limit of the range set out above, it is not necessary to use the extended period of time required for the reaction at the lower temperature, and therefore I can use a time of reaction which is near the lower limit of the operative time range.

My process is operated under autogenous pressure generated by liberated hydrogen chloride in the closed reaction system. I have found that an initial pressure of at least about 1 atmosphere acts to keep hydrogen chloride liberated at the beginning of the reaction in the reaction mixture. The initial pressure of HCl which I prefer to use is about five atmospheres.

It is to be noted that the melting point of the beta isomer of benzene hexachloride is 310° C. which temperature is well above the lower limit of the operative temperature range set out above. However, the beta isomer sublimes at a temperature of approximately 150° C. and therefore reacts in the vapor phase, the rest of the isomers melting at temperatures below the lower limit of the range set out above and thereafter reacting in the liquid phase. The tendency of the beta isomer to sublime is actually a disadvantage since the vapors tend to solidify and clog up valves, lines, etc. I have, therefore, found it advisable to add to the reaction mixture an inert, stable liquid such as 1,2,4-trichlorobenzene which tends to keep the beta isomer in the liquid phase thus eliminating the problem of clogging of lines and valves referred to above. I have mentioned 1,2,4-trichlorobenzene as being a suitable compound for addition to the reaction mixture in order to minimize sublimation of the beta isomer, however, any inert liquid compound which tends to dissolve benzene hexachloride and which is stable under the reaction conditions is operative. Other examples are hexachlorobutadiene, certain aliphatic naptha fractions, and certain paraffinic kerosene fractions. I prefer to add 1,2,4-trichlorobenzene since this compound is the main product of the thermal and alkali dehydrochlorination of benzene hexachloride under non-catalytic conditions and therefore no compound not already present is being added to the reaction.

The molar ratios of trichlorobenzene to benzene hexachloride which I can use in my process range from a ratio of about 10 parts of 1,2,4-trichlorobenzene per part of benzene hexachloride to a ratio of about 0.25 part of 1,2,4-trichlorobenzene per part of benzene hexachloride. The molar ratio of 1,2,4-trichlorobenzene to benzene hexachloride which I prefer to employ in my reaction is about 4 parts of 1,2,4-trichlorobenzene per part of benzene hexachloride.

The following examples are offered to illustrate my invention but it is not intended that my invention be construed as being limited to the particular steps and conditions shown in the examples.

Example I

A 233-gram portion of a mixture of the alpha and beta isomers of benzene hexachloride, 725 grams of 1,2,4-trichlorobenzene, and 107 grams of aluminum chloride was heated at 200° C. for 20 hours in a closed pressure vessel, the initial pressure being about 5 atmospheres of HCl. Upon completion of the reaction, 514 grams of a mixture of 1,3,5-trichlorobenzene and 1,2,4-trichlorobenzene was recovered, which mixture upon careful fractionation yielded 128 grams of 1,3,5-trichlorobenzene. In addition 65.6 grams of 1,2,4,5-tetrachlorobenzene and 35 grams of a mixture of pentachlorobiphenyl and hexachlorobiphenyl were recovered. The yield of the products consisting of 1,3,5-trichlorobenzene, 1,2,4,5-tetrachlorobenzene, pentachlorobiphenyl and hexachlorobiphenyl was 85%.

Example II

A 440-gram portion of a mixture of the alpha, beta, delta and epsilon isomers of benzene hexachloride, and 30 grams of aluminum chloride were heated at 210° C. for 16 hours in a closed pressure vessel, the initial pressure being 5 atmospheres of HCl. Upon completion of the reaction, 165 grams of a mixture of 1,3,5-trichlorobenzene and 1,2,4-trichlorobenzene was recovered and upon fractionation the mixture yielded 41 grams of 1,3,5-trichlorobenzene.

Example III

An experiment was conducted using the process of Example I except that no benzene hexachloride isomers were added in order to demonstrate that the 1,3,5-trichlorobenzene is not formed from the 1,2,4-trichlorobenzene which is added to suppress sublimation of the beta isomer of benzene hexachloride. Following the procedure of Example I, 725 grams of 1,2,4-trichlorobenzene and 107 grams of aluminum chloride were mixed in a pressure vessel and anhydrous hydrogen chloride added at 26° C. until the pressure reached 75 pounds per square inch. The hydrogen chloride was added because benzene hexachloride liberates it upon heating. The mixture was heated at 200° C. for 20 hours the starting pressure being about 5 atmospheres. Upon completion of the reaction, 665 grams of trichlorobenzene was recovered which upon analytical fractionation gave no 1,3,5-trichlorobenzene indicating that the 1,2,4-trichlorobenzene was not isomerized and that the 1,3,5-trichlorobenzene produced in the experiment of Example I came from the benzene hexachloride and not the 1,2,4-trichlorobenzene added.

It will be noted that in the above specific examples a temperature range of from 200° to 210° was employed.

This application is a continuation-in-part of my application Serial No. 177,565 filed August 3, 1950, now abandoned.

Now having disclosed my invention, what I claim is:

1. The process which comprises heating in a closed reaction zone, in the presence of HCl liberated in the process, a mixture of benzene hexachloride and a Friedel-Crafts catalyst, at a temperature of from about 200° to 210° C. and for a time period ranging from about 24 to 16 hours, the molecular proportions of benzene hexachloride to catalyst ranging from about 0.5:1 to 8:1, whereby a reaction product is obtained which contains 1,3,5-trichlorobenzene, 1,2,4,5-tetrachlorobenzene, pentachlorobiphenyl and hexachlorobiphenyl.

2. The process which comprises heating in a closed reaction zone, in the presence of HCl liberated in the process, at a temperature ranging from about 200° to 210° C. and for a time ranging from about 24 to 16 hours, a mixture of the following components in the proportions by weight of from about 0.5 to 8 moles of benzene hexachloride, 1 mole of a Friedel-Crafts catalyst, and from about 5 to 10 moles of an inert stable liquid tending to dissolve the benzene hexachloride; HCl being added to the reaction zone at the start of the process to produce an initial pressure of at least about 1 atmosphere of HCl, whereby a reaction product is obtained which contains 1,3,5-trichlorobenzene, 1,2,4,5-tetrachlorobenzene, pentachlorobiphenyl and hexachlorobiphenyl.

3. The process which comprises heating in a closed reaction zone, in the presence of HCl liberated in the process, at a temperature ranging from about 200° to 210° C. and for a time ranging from about 24 to 16 hours, a mixture of the following components in the proportions by weight of from about 0.5 to 8 moles of benzene hexachloride, 1 mole of aluminum chloride, and from about 5 to 10 moles of an inert stable liquid tending to dissolve the benzene hexachloride; HCl being added to the reaction zone at the start of the process to produce an initial pressure of at least about 1 atmosphere of HCl, whereby a reaction product is obtained which contains 1,3,5-trichlorobenzene, 1,2,4,5-tetrachlorobenzene, pentachlorobiphenyl and hexachlorobiphenyl.

4. The process of claim 1 wherein the catalyst is aluminum chloride.

5. The process of claim 2 wherein the inert stable liquid is 1,2,4-trichlorobenzene.

6. The process of claim 3 wherein the inert stable liquid is 1,2,4-trichlorobenzene.

7. The process which comprises heating a mixture of about 1 molar part of benzene hexachloride and about 5 molar parts of 1,2,4-trichlorobenzene in a closed system under autogenous pressure in the presence of about 1 molar part of aluminum chloride to a temperature of about 200° C. for a period ranging between about 16 and 24 hours; HCl being added at the start of the process to produce an initial pressure of at least 5 atmospheres of HCl; whereby a reaction product is obtained which contains 1,3,5-trichlorobenzene, 1,2,4,5-tetrachlorobenzene, pentachlorobiphenyl and hexachlorobiphenyl.

References Cited in the file of this patent

UNITED STATES PATENTS 2,569,441    Alquist et al. _____ Oct. 2, 1951

OTHER REFERENCES

Van der Linden: "Ber. der deut. Chem. Gesell.," vol. 45, pp. 239–47 (1912).